June 23, 1931.  F. W. REILLY  1,811,697
WIRE ROPE
Filed Feb. 19, 1930

INVENTOR
FRANK W. REILLY
BY
ATTORNEY

Patented June 23, 1931

1,811,697

UNITED STATES PATENT OFFICE

FRANK WARD REILLY, OF CHATTANOOGA, TENNESSEE, ASSIGNOR TO WILLIAMSPORT WIRE ROPE COMPANY, A CORPORATION OF PENNSYLVANIA

WIRE ROPE

Application filed February 19, 1930. Serial No. 429,546.

This invention relates to new and useful improvements in wire ropes and has particular reference to ropes which are subjected to severe usage of strain and wear and friction such, for example, as those employed in the pumping of oil wells.

The main object of the invention is to provide a simple, compact, durable and efficient wire rope so constructed and arranged that the customary seepage or leakage of oil or other liquid into which the rope is immersed will not flow upwardly within the rope as is often the case in wells and particularly those in which pressure is applied tending to force oil into and to flow through the rope.

A further object of the invention is to provide a simple and efficient seal between the outer lay and the core of a wire rope to prevent the seepage therethrough of any liquid in which the wire rope may be immersed during working.

Further and more specific objects, features, and advantages will more clearly appear from the detailed description given below when taken in connection with the accompanying drawings which form part of the specification and which illustrate one present preferred form of the invention.

In pumping especially with wire ropes and lines, altho they have proved superior in many respects to former lines employed, it has been a problem to avoid the seepage or flow of the pumped liquid up through the rope between the lays of the strands and through the core of the rope when that was of some soft absorbent material. My invention then in general involves the use of a simple and effective seal within the rope and preferably between the strands of the core and the outer lay, or in some cases in spaces between strands of the outer rope or lay, which prevents this seepage. The invention also includes the use in some instances of a cover or coating for the sealing material which will tend to make it more resistant to the action of surrounding liquids.

The nature and advantages of the invention are better understood after a brief explanation of operating conditions. When a wire rope is used, instead of a jointed rod, to operate a reciprocating plunger pump near the bottom of the well, the rope serves to actuate this piston or plunger in the same manner that a piston rod actuates an ordinary pump, except that the pump is single acting and the rope is required only to take tension stress. At the surface of the well is a stuffing box and gland similar to those ordinarily used with piston rods. Due to the irregular exterior of the rope it is impractical to have this packing engaged directly with the rope. For this reason the rope at the point where it passes through the stuffing box or gland is passed through a steel tube of internal diameter suitable to accommodate the rope. The exterior of this tube comes in contact with the packing of the stuffing box in the same manner as does the ordinary piston rod. The tube need be only of sufficient length to properly accommodate the length of stroke being used. The tube is provided at its upper end with a clamp, positively connecting the tube to the rope and at or near the top of the tube and below the clamp is a stuffing box with suitable packing by which all interstices between the inner surfaces of the tube and the rope may be completely filled and leakage between the tube and rope positively prevented. This does not, however, prevent leakage of oil internally through any channels within the rope as ordinarily constructed.

Under working conditions the oil surrounding the rope is subjected to pressure from various causes such as both static and friction head (or pressure) above the derrick floor. The oil is customarily pumped from the well to field tanks or separation tanks the tops of which may usually be somewhat higher than the derrick floor, and in some instances these tanks have elevated positions and are at some distance away thus causing the stated static and friction head. Because of such pressure, or pressure otherwise applied to oil in which the rope is immersed, oil is forced through interstices of the rope and thus through the rope where it passes through the stuffing box within the tube above referred to and this oil is wasted and is also a cause of great annoyance by leakage over the casinghead, floor, etc. The invention provides means for internally sealing the rope and preventing such leakage. It would be sufficient to apply such sealing means at one suitable point, or through one stretch of the rope of moderate length as, for instance, the stretch of the rope which reciprocates along with the tube within the stuffing box, but it is impractical to determine in advance what part of the rope will require sealing and, therefore, the sealing means between strands of the wire rope usually extends throughout the length of the rope so that sealing may be effective no matter what portion of the rope is located at the point where leakage may occur.

It is desirable to use a rope with an independent wire rope center because of the more desirable characteristics of this type of rope, in which a higher modulus of elasticity can be secured and the extension of lay which results in permanent stretch may be minimized, and the flexural and torsional stresses in the outer strands are reduced because of the greater rigidity of the core.

The invention is clearly shown in the accompanying drawings, in which.

Figure 3:
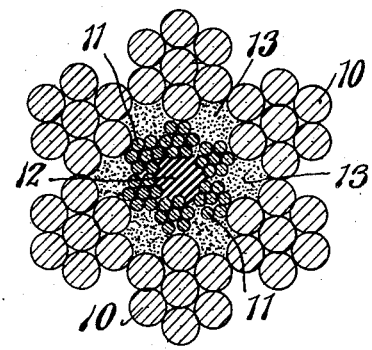
Fig. 3 is a cross section through the form of rope shown in Fig. 1.

As shown in the drawings, the present preferred form of the invention is employed in the operation of wire ropes especially in pumping oil wells. Such ropes generally consist of an outer lay of twisted strands of wire, as 10, which are laid spirally in one direction over a core of twisted strands of wire 11 preferably laid in a spirally opposite direction. As shown in Fig. 3, the core 11 may have a soft center 12, otherwise the center strands of the complete rope center 11 may be a twisted wire strand similar to the outer strands of this rope center structure.

Figure 1:
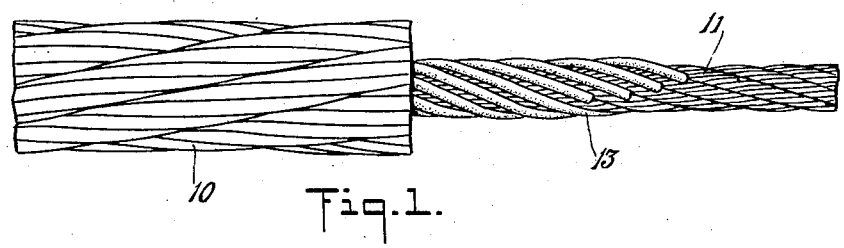
Fig. 1 is a side elevation of the improved rope with certain parts broken away.
Figure 2:
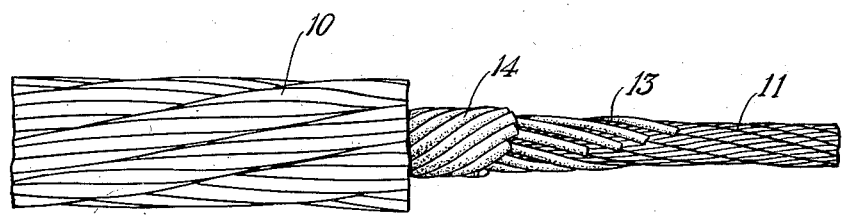
Fig. 2 is a similar view of a modification.

A consideration of Figs. 1 and 3 will make apparent the fact that there will ordinarily be formed channels between the wire strands 10 in the outer lay and the strands 11 of the core. It has been shown in use that the liquid being pumped, especially when under pressure in ways or for reasons above stated, has been forced some times in considerable quantities up the rope or line through these channels. To prevent this the invention includes a seal or packing to be disposed between the outer lay and the core and preferably comprises strands such as 13 of manila, jute, paper or other suitable relatively soft or compressible material, usually of a fibrous character, provided or saturated with a covering of a heavy lubricant of sufficiently viscous nature to protect the body of the seal against the action of acids and other liquids which would ordinarily have a deleterious effect upon the seal. These sealing strands are laid as shown in the channels formed between the strands of the core 11, and therefore will have a spiral run in the same direction.

While the stands 13 for illustrative convenience are shown as being of apparently compact form similar to fibrous cords, they are preferably in reality of relatively soft or loose material such that it is readily compressed and formed to fit and fill the interstices of the wire rope. In addition to the strands 13, other strands may be laid in the same direction between the strands 13 thus providing additional filling or packing material.

In the form shown in Fig. 3, the sealing effect may be augmented by means of sealing strands, as 14, which will be laid in the channels formed between the strands of the outer lay 10 and will have therefore a spiral run opposite to that of the sealing strands 13. These sealing strands 14 are preferably likewise covered with a heavy wax or viscous lubricant to make them liquid and acid proof.

It will be understood that on account of the relatively soft and compressible nature of the filling or sealing strands such as 13, 14, or any of them, as they are properly laid between wire strands in the process of manufacture, they are compressed and forced to fill all the interstices between the various wire strands and leakage of the oil through the rope is thus effectively prevented.

The problem that has perplexed the trade has therefore been met in a simple and efficient manner. The seepage of liquid through the core with the consequent substantial loss and annoyance is avoided, and incidentally the strands of the outer lay and the core are more intimately bound together by reason of the elimination of the open channels usually formed therebetween.

While the invention has been described in detail and with especial respect to the present preferred form thereof, it is not to be limited to such details since many changes may be made and the invention embodied in other forms and modifications without departing from the spirit and scope of the invention in its broadest aspects. Hence it is desired to cover any and all forms and modifications which may come within the language or scope of any one or more of the appended claims.

What is claimed is:

1. A wire rope for oil well pumping and analogous purposes, comprising a wire rope center including a plurality of strands, each of which consists of a plurality of wires, and a plurality of outer strands each consisting of a plurality of wires, the outer strands being in approximately direct contact with portions of the center strands and with longitudinal interstices between the outer and center strands, and fibrous packing impregnated with liquid proof material compressed and completely filling said interstices and preventing leakage of oil or other liquid surrounding the rope through the rope interstices.

2. A wire rope for oil well pumping and analogous purposes, comprising a wire rope center including a plurality of strands, each of which consists of a plurality of wires, and a plurality of outer strands each consisting of a plurality of wires, the lay of the outer strands being opposite to that of the center strands and the outer strands being in approximately direct contact with portions of the center strands and with longitudinal interstices between the outer and center strands, and fibrous packing impregnated with liquid proof material compressed and completely filling said interstices and preventing leakage of oil or other liquid surrounding the rope through the rope interstices.

Signed at Chattanooga, county of Hamilton, State of Tennessee, this 15 day of February, 1930.

FRANK WARD REILLY.